United States Patent
Pan et al.

(10) Patent No.: US 10,225,714 B2
(45) Date of Patent: Mar. 5, 2019

(54) SYSTEM AND METHOD FOR TRANSMITTING, STORING RECEIVING AND/OR RETRIEVING IDENTIFICATION INFORMATION OR DATA AND/OR PAIRING INFORMATION OR DATA BETWEEN ACCESSORIES OR ASSOCIATED PRODUCTS AND SMART ELECTRONIC DEVICES INTO AND/OR FROM ANY DISTINCT SERVER OR STORAGE MEDIA

(71) Applicant: SALUTICA ALLIED SOLUTIONS SDN. BHD., Perak (MY)

(72) Inventors: Yoon Shing Pan, Perak (MY); Kean Hoo Chong, Perak (MY); Wee Yeoh Tan, Perak (MY); Chang Tih Ho, Perak (MY)

(73) Assignee: SALUTICA ALLIED SOLUTIONS SDN. BHD., Perak (MY)

( * ) Notice: Subject to any disclaimer, the term of this patent is extended or adjusted under 35 U.S.C. 154(b) by 6 days.

(21) Appl. No.: 14/647,789

(22) PCT Filed: Nov. 28, 2012

(86) PCT No.: PCT/MY2012/000288
§ 371 (c)(1),
(2) Date: May 27, 2015

(87) PCT Pub. No.: WO2014/084707
PCT Pub. Date: Jun. 5, 2014

(65) Prior Publication Data
US 2015/0312705 A1    Oct. 29, 2015

(51) Int. Cl.
*H04W 4/80*    (2018.01)
*H04W 4/60*    (2018.01)
(Continued)

(52) U.S. Cl.
CPC .......... *H04W 4/80* (2018.02); *H04M 1/7253* (2013.01); *H04M 1/72527* (2013.01);
(Continued)

(58) Field of Classification Search
CPC .......... H04M 1/72527; H04M 1/7253; H04W 4/008; H04W 4/003; H04W 4/206; H04W 4/005
(Continued)

(56) References Cited

U.S. PATENT DOCUMENTS

| | | | |
|---|---|---|---|
| 2009/0081999 A1* | 3/2009 | Khasawneh | H04M 3/56 455/416 |
| 2011/0171908 A1* | 7/2011 | Hua | H04W 76/02 455/41.2 |

(Continued)

*Primary Examiner* — Nay A Maung
*Assistant Examiner* — Angelica M Perez
(74) *Attorney, Agent, or Firm* — WPAT, P.C., Intellectual Property Attorneys; Anthony King

(57) ABSTRACT

The present invention relates to a system and method for transmitting, storing receiving and/or retrieving identification information or data and/or pairing information or data between accessories or associated products and smart electronic devices into and/or from any distinct server or storage media. Accordingly, the present invention enables the user to transmit and/or store all identification information or data and/or pairing information or data of accessory or associated products that have been connected or paired to an existing smart device into a distinct server or storage media, and enables those information or data to be retrieved and/or received from the said server or storage media, into the same or another smart electronic device for the purposes of establishing and/or maintain connection and/or communication with the said accessory or associated products without the need to reinitiate the pairing process.

15 Claims, 2 Drawing Sheets

(51) Int. Cl.
*H04M 1/725* (2006.01)
*H04W 4/70* (2018.01)
*H04W 4/21* (2018.01)

(52) U.S. Cl.
CPC ................ *H04W 4/60* (2018.02); *H04W 4/21* (2018.02); *H04W 4/70* (2018.02)

(58) Field of Classification Search
USPC ............................................... 455/41.1–41.3
See application file for complete search history.

(56) References Cited

U.S. PATENT DOCUMENTS

| | | | | |
|---|---|---|---|---|
| 2011/0303741 | A1* | 12/2011 | Bolton ................. | G06Q 10/087 235/375 |
| 2012/0075173 | A1* | 3/2012 | Ashbrook ............... | G06F 3/014 345/156 |
| 2013/0316649 | A1* | 11/2013 | Newham ............... | H04W 88/04 455/41.2 |

* cited by examiner

SYSTEM AND METHOD FOR TRANSMITTING, STORING RECEIVING AND/OR RETRIEVING IDENTIFICATION INFORMATION OR DATA AND/OR PAIRING INFORMATION OR DATA BETWEEN ACCESSORIES OR ASSOCIATED PRODUCTS AND SMART ELECTRONIC DEVICES INTO AND/OR FROM ANY DISTINCT SERVER OR STORAGE MEDIA

FIELD OF INVENTION

The present invention relates generally to a system and method for transmitting, storing receiving and/or retrieving identification information or data and/or pairing information or data between accessories or associated products and smart electronic devices into and/or from any distinct server or storage media.

BACKGROUND OF INVENTION

Portable communication systems and devices have been integrated into many facets of daily life and are now commonly carried by persons or users throughout the day. Due to the development and rapid change of electronic communication industries, electronic devices such as cellular or mobile phones, smart phones, computers, laptops, tablets computers, personal digital assistants or any communication devices and the like, are becoming necessities in modern society and are becoming an important means for information transmission. As is well known in the art, such electronic devices are evolving into intelligent/smart devices with computer-support functions as well as various support applications ("APP") for advanced operation and functionality.

Such intelligent/smart electronic devices ("Primary Device") are commonly used together or in conjunction with various accessories or associated products ("Secondary Device") as an additional utility depending on the user's necessities. Recently, such Primary Devices, for example, smartphones are selectively connected in a wired or wireless manner to implement extensive networks and functionality. In particular, such Primary Devices are personalized according to the user's characteristics, and network environments between devices are also personalized according to the user's characteristics. For instance, there are various Secondary Devices that can be paired to and used in conjunction with Primary Device for further or additional operations and functionality. Such pairing typically involves a situation where the Secondary Device will have unique or particular identification information or data ("ID") or even pairing information or data ("Pairing Information") that is typically stored in its non-volatile or flash memory. Accordingly, the Primary Device will usually have the capability to, whether in a wired or wireless manner, connect and communicate with such Secondary Devices using the Secondary Device's ID and/or Pairing Information. The pairing process typically takes place whereby the Primary Devices will scan for the presence of Secondary Devices and the Secondary Devices will signal or "advertise" their presence to be detected by such Primary Devices. Upon confirmation, whether by the user or otherwise, that a particular Primary Device is to be connected to a particular Secondary Device, the Primary Device will receive or receive and store the ID and/or Pairing Information of the Secondary Device in order to maintain the said wired or wireless connection as well as communicate with the Secondary Device.

However, it has been found that difficulties usually occur when the user wishes to substitute his/her existing Primary Device with a different Primary Device. As the ID and/or Pairing Information between the Secondary Devices and the existing Primary Device is only contained in the said existing Primary Device, the process of pairing the Secondary Devices needs to be reinitiated in order to pair them to a different Primary Device. Particularly, it becomes a troublesome and repetitive process to pair all the existing Secondary Device to substitute Primary Device. Similarly, where the relevant ID and/or Pairing Information that is stored in the Primary Device has been erased, lost, become unusable or reformatted, the pairing process will need to be reinitiated as well.

In view of these and other shortcomings, it is desirous to provide a system and method for transmitting, storing, receiving and/or retrieving the relevant identification information or data and/or pairing information or data between these Secondary Devices and Primary Devices into and/or from any distinct server or storage media in order to circumvent the necessity of reinitiating or repeating the pairing process.

Accordingly, the present invention enables the user to transmit and/or store all pairing information between the Secondary Devices and existing Primary Devices into the distinct server or storage media, and enables such Pairing Information to be retrieved and/or received into such substitute or other Primary Devices which will then circumvent the need of reinitiating the pairing process.

SUMMARY OF THE INVENTION

The present invention relates to a system for transmitting, storing receiving and/or retrieving identification information or data and/or pairing information or data between accessories or associated products and smart electronic devices into and/or from any distinct server or storage media.

Accordingly, the system for transmitting, storing receiving and/or retrieving all relevant identification information or data ("ID") and/or pairing information or data ("Pairing Information") between accessories or associated products and smart electronic devices into and/or from any distinct server or storage media, the system includes: a) at least one smart electronic device ("Primary Device"); b) at least one accessory or associated product of the Primary Device ("Secondary Device") whether wired or wirelessly connected with the said Primary Device; and c) at least one server or storage media ("Host") that is in association and/or communication with the Primary Device, whether via a wired or wireless network, cellular network, broadband, the internet, cloud computing, or otherwise; wherein the system involves the firmware and/or software application ("APP") of the Primary Device which is in association and/or communication with the Host.

In the preferred system, the Secondary Device may be any wirelessly enabled device. By way of example but not limitation, the Secondary Device may be Bluetooth headsets, Bluetooth proximity tags, Bluetooth heart rate sensors, Zigbee smart home devices, ANT+ health care devices, wireless or Radio Frequency (RF) connection devices or any other wireless enabled apparatus or associated devices.

Preferably, the Secondary Device is wirelessly connected with the Primary Device using wireless enabled apparatus such as Bluetooth, WiFi, near field communication (NFC), Zigbee, ANT+ or any other wireless or Radio Frequency (RF) connection. It will be appreciated that the wireless enabled apparatus can be any device that uses other wireless technologies for pairing or connecting with the Primary Device.

Preferably, the Primary Device is enabled with pairing capabilities such as Bluetooth, WiFi, near field communication (NFC), Zigbee, ANT+ or any other wireless or Radio Frequency (RF) connection. By way of example but not limitation, the Primary Device is a smartphone, cellular or mobile phone, smart tablet, computer, laptop, personal digital assistants or any smart devices and the like.

It will be appreciated that the Host of the preferred system can be Web Servers, SQL servers, Cloud computing system or any other available servers, storage medias or database systems.

In the preferred system, the Secondary Device contains device or unique identification information or data ("ID") and may also have pairing information or data ("Pairing Information") that may be stored in its non-volatile memory, flash memory or otherwise. It should be noted that the ID and/or Pairing Information can be transmitted by the Secondary Device and/or retrieved by the Primary Device for the purposes of establishing and/or maintaining the connection and/or communication between the Primary Device and the Secondary Device. It will further be appreciated that the ID or Pairing Information may also include MAC addresses, BT addresses, Device Serial Numbers, or other specific data or coding and the like.

Preferably, the firmware and/or software application ("APP") in the Primary Device is capable of transmitting and/or storing any or all ID and/or Pairing Information that have been received or retrieved by the Primary Device into a Host. Similarly, the APP in a Primary Device is capable of retrieving and/or receiving ID and/or Pairing Information from a Host.

Preferably, where a Primary Device has received and/or retrieved ID and/or Pairing Information from Secondary Devices for the purposes of establishing and/or maintaining connection and/or communication with such Secondary Devices, the APP will obtain such ID and/or Pairing Information from the Primary Device and transmit and/or store the said ID and/or Pairing Information into a Host. Where the user subsequently wishes to substitute an existing Primary Device that has previous or existing pairings with existing Secondary Devices, the user will be enabled to, via the APP of the substitute Primary Device, receive and/or retrieve the relevant ID and/or Pairing Information from the Host for the purposes of establishing and/or maintaining connection and/or communication with the existing Secondary Devices. This will circumvent the need of reinitiating the pairing process for each of the existing Secondary Devices.

The present invention also provides a method for transmitting and/or storing all relevant identification ("ID") and/or pairing information and/or data ("Pairing Information") that has been received and/or retrieved by a smart electronic devices ("Primary Device") from an accessory or associated product ("Secondary Device") into any distinct server or storage media ("Host"), the method includes: a) pairing or connecting at least one Secondary Device to at least one Primary Device whether in a wired manner or wirelessly; b) associating and/or establishing communications between a firmware and/or software application ("APP") in the said Primary Device with a Host; wherein the said Primary Device receives and/or retrieves ID and/or Pairing Information from the said Secondary Device; and c) transmitting and/or storing, via the firmware or software application ("APP") of the said Primary Device, the ID and/or Pairing Information of the said Secondary Device that has been received and/or retrieved by the said Primary Device into the said Host.

Preferably, the Secondary Device and Primary Device is enabled with pairing capabilities such as Bluetooth, WiFi, near field communication (NFC), Zigbee, ANT+ or any other wireless or Radio Frequency (RF) connection. It will be appreciated that the pairing capabilities can be any other wireless technologies for pairing or connecting the Primary Device with the Secondary Device. By way of example but not limitation, the Primary Device of the present invention is a smartphone, cellular or mobile phone, smart tablet, computer, laptop, personal digital assistants or any smart devices and the like. By way of example but not limitation, the Secondary Device may be Bluetooth headsets, Bluetooth proximity tags, Bluetooth heart rate sensors, Zigbee smart home devices, ANT+ health care devices, wireless or Radio Frequency (RF) connection devices or any other wireless enabled apparatus or associated devices.

It will be appreciated that the Secondary Device will have a device or unique identification information or data ("ID") and/or pairing information or data ("Pairing Information") for the purposes of establishing and/or maintaining connections and/or communications with Primary Devices. It will also be appreciated that the ID and/or Pairing Information may also include MAC addresses, BT addresses, Device Serial Numbers, or other specific data or coding and the like for the purposes of establishing and/or maintaining connection and/or communication between the Primary Device and the Secondary Device.

It will also be appreciated that the Host of the preferred method can be Web Servers, SQL servers, Cloud computing system or any other available servers, storage medias or database systems.

In the preferred method, the APP is able to control the pairing function of the Primary Device in order to obtain ID and/or Pairing Information that have been retrieved or received by the said Primary Device for the purposes of connecting and/or communicating with any Secondary Device. The APP is able to transmit and/or store any or all ID and/or Pairing Information that it has obtained from the Primary Device into a Host. It will be appreciated that the APP can be in association and/or communication with the Host via any form of connection, whether via a wired or wireless network, cellular network, broadband, the internet, cloud computing, or otherwise.

The present invention is further provided with a method for retrieving and/or receiving from any distinct server or storage media ("Host"), any or all relevant identification ("ID") and/or pairing information and/or data ("Pairing Information") of accessories or associated products ("Secondary Device") that has previously been transmitted to and/or stored into the said Host, into a smart electronic device ("Primary Device") in order to establish and/or maintain connections and/or communications between the Primary Device and Secondary Device. Accordingly, the method includes: a) associating and/or establishing communications between a firmware and/or software application ("APP") in a Primary Device with a Host; b) retrieving and/or receiving any or all ID and/or Pairing Information from the said Host, via the firmware and/or software application ("APP") in the said Primary Device, into the said Primary Device; and c) using such retrieved and/or received ID and/or Pairing Information, via the APP of the said Primary Device, to establish and/or maintain connection and/or communication between the said Primary Device and the relevant Secondary Devices.

Preferably, the Secondary Device and Primary Device is enabled with pairing capabilities such as Bluetooth, WiFi, near field communication (NFC), Zigbee, ANT+ or any other wireless or Radio Frequency (RF) connection. It will be appreciated that the pairing capabilities can be any other wireless technologies for pairing or connecting the Primary Device with the Secondary Device.

By way of example but not limitation, the Primary Device of the present invention is a smartphone, cellular or mobile phone, smart tablet, computer, laptop, personal digital assistants or any smart devices and the like. By way of example but not limitation, the Secondary Device may be Bluetooth headsets, Bluetooth proximity tags, Bluetooth heart rate sensors, Zigbee smart home devices, ANT+ health care devices, wireless or Radio Frequency (RF) connection devices or any other wireless enabled apparatus or associated devices.

It will be appreciated that the Secondary Device will have a device or unique identification information or data ("ID") and/or pairing information or data ("Pairing Information") for the purposes of establishing and/or maintaining connections and/or communications with Primary Devices. It will also be appreciated that the ID and/or Pairing Information may also include MAC addresses, BT addresses, Device Serial Numbers, or other specific data or coding and the like for the purposes of establishing and/or maintaining connection and/or communication between the Primary Device and the Secondary Device.

It will also be appreciated that the Host of the preferred method can be Web Servers, SQL servers, Cloud computing system or any other available servers, storage medias or database systems.

In the preferred method, the Host would contain ID and/or Pairing Information of Secondary Devices that have previously been transmitted to and/or stored into it. The APP in the Primary Device is able to retrieve and/or receive any or all such ID and/or Pairing Information from the Host. It will be appreciated that the APP can be in association and/or communication with the Host via any form of connection, whether via a wired or wireless network, cellular network, broadband, the internet, cloud computing, or otherwise.

The APP is able to control the pairing function of the Primary Device to utilize the ID and/or Pairing Information that have been retrieved and/or received from a Host for the purposes of establishing and/or maintaining connection and/or communication with the relevant Secondary Device.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Figure 1:
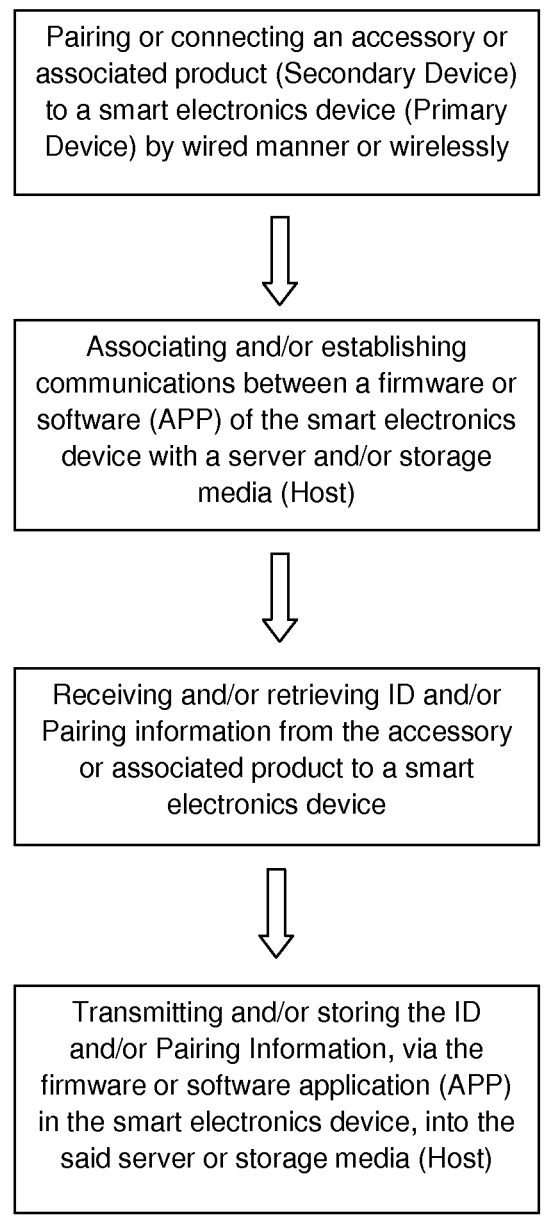
FIG. 1 is a block diagram illustrating the transmitting and/or storing of ID and/or Pairing Information between a Secondary Device and a Primary Device into a Host via the APP of the Primary Device according to present invention.

The present invention relates to a system and method for transmitting and/or storing identification information or data ("ID") and/or pairing information or data ("Pairing Information") between accessories or associated products ("Secondary Device") and smart electronic devices ("Primary Device") into and/or from any distinct server or storage media ("Host"). Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The system and method for transmitting and/or storing ID and/or Pairing Information between Secondary Devices and Primary Devices into and/or from any Host according to the preferred method of the present invention will now be described in accordance to the accompanying drawings FIGS. 1 to 2, either individually or in any combination thereof.

The present invention generally involves firmware and/or software application ("APP") either of the Secondary Device and/or the Primary Device as well as the APP of the Primary Device that is in association and/or communication, whether in a wired manner or wirelessly, with a Host.

By way of example but not limitation, the Secondary Device may be Bluetooth enabled devices such as Bluetooth headsets, Bluetooth proximity tags, Bluetooth heart rate sensors, Zigbee smart home devices, ANT+ health care devices, wireless or Radio Frequency (RF) connection devices or any other wireless enabled apparatus or associated devices and the like. Accordingly, the invention is preferably directed to the Secondary Device and the Primary Device having pairing functions, such as for example, Bluetooth version 4.0 and above, WiFi, near field communication (NFC), Zigbee, ANT+ or any other wireless or Radio Frequency (RF). However, it will be appreciated that lower Bluetooth versions or any other wireless technologies for pairing or connecting the Secondary Device with the Primary Device may also be used.

In the preferred embodiment, the Primary Device can be of, but not limited to a smartphone, cellular or mobile phone, smart tablet, computer, laptop, personal digital assistants or any smart devices and the like.

The Host can be of, for example, but not limited to Web Servers, SQL servers, Cloud Computing System or any other available servers, storage media or database systems.

It will be appreciated that the Secondary Device will have a device or unique identification information or data ("ID") and/or pairing information or data ("Pairing Information") for the purposes of establishing and/or maintaining connections and/or communications with Primary Devices. Such ID and/or Pairing Information is typically stored in the non-volatile or flash memory of the Secondary Device. It will also be appreciated that the ID and/or Pairing Information may also include MAC addresses, BT addresses, Device Serial Numbers, or other specific data or coding and the like for the purposes of establishing and/or maintaining connection and/or communication between the Primary Device and the Secondary Device.

By way of an example but not limitation, the connection or pairing between the Primary Device and the Secondary Device generally involves the Primary Device, via its pairing functions, receiving and/or retrieving ID and/or Pairing Information from the Secondary Device. This is typically carried our whereby the Primary Device will, via its pairing functions, scan for any broadcast or presence of a Secondary Device whilst a Secondary Device, also via its pairing functions, will broadcast or "advertise" its presence to be detected by the Primary Device. Upon the Primary Device detecting the Secondary Device, and usually requiring the user's confirmation that the connection is to be established, it will then receive and/or retrieve the relevant ID and/or Pairing Information from the Secondary Device. Once the Primary Device has received and/or retrieved such ID and/or Pairing Information from the Secondary device, it will proceed to utilize such ID and/or Pairing Information, via its pairing functions, to establish as well as to maintain connection and/or communication with the Secondary Device. The ID and/or Pairing Information of each Secondary Device is usually unique or specific to itself. As such, Primary Devices are usually only able to connect and/or pair with Secondary Devices by utilizing particular ED and/or Pairing Information that is unique and/or specific to such Secondary Devices. The pairing process also generally involves specific protocols and specifications base on the available wireless technologies.

Referring to FIG. 1, the preferred block diagram illustrates the transmitting and/or storing of ID and/or Pairing Information between a Secondary Device and a Primary Device into a Host via the APP of the Primary Device. In the preferred process, the APP controls the pairing functions of the Primary Device to obtain ID and/or Pairing Information regarding existing or previously paired Secondary Devices that have been received and/or retrieved by the Primary Device.

In the preferred process, the APP will then transmit and/or store the ID and/or Pairing Information that it has obtained from the Primary Device into the Host which can subsequently be retrieved and/or received by the APP if need be. It will be appreciated that the APP can be in association and/or communication with the Host via any form of connection, whether in a wired manner or wirelessly, and whether through a network, the internet, cloud computing or otherwise.

Figure 2:
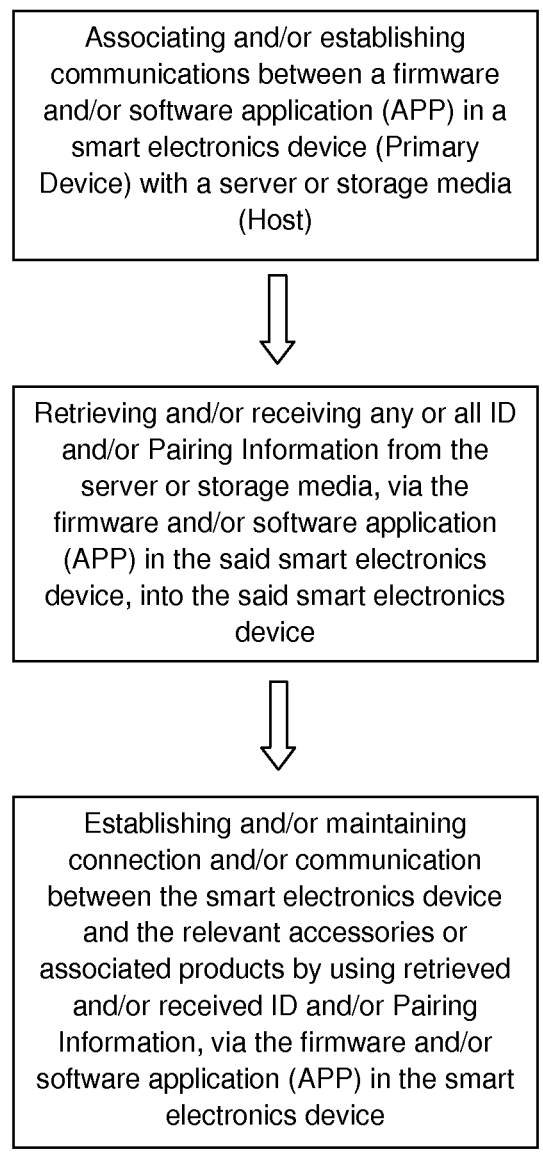
FIG. 2 is a block diagram illustrating the receipt and/or retrieval of relevant ID and/or Pairing Information from a Host for the purposes of pairing Secondary Devices to a Primary Device according to the present invention.

Referring now to FIG. 2, the preferred block diagram illustrates the receipt and/or retrieval of relevant ID and/or Pairing Information from a Host for the purposes of pairing existing Secondary Devices to a substitute Primary Device. Accordingly, where the user wishes to substitute an existing Primary Device that has previous or existing connections with existing Secondary Devices, the user will, via the APP of the substitute Primary Device, retrieve and/or receive from the Host the relevant ID and/or Pairing Information that was previously transmitted to and/or stored into the said Host. The APP will then control the pairing functions of the substitute Primary Device to utilize the relevant ID and/or Pairing Information that has been received and/or retrieved from the Host to establish and/or maintain connection and/or communication with the existing Secondary Devices. It will be appreciated that the ID and/or Pairing Information that was previously transmitted to and/or stored into a Host may not necessarily have been so transmitted and/or stored via the system and method as illustrated in FIG. 1 and may have been so transmitted and/or stored into the Host via other means independent of the Primary Device, the APP and/or even the Secondary Device. As such, it also enables the user to transmit and/or store all pairing information between the Secondary Devices and existing Primary Devices into the distinct server or storage media, and enables such Pairing Information to be retrieved and/or received into the substitute or other Primary Devices which will then circumvent the need of reinitiating the pairing process.

Similarly, in the event where the relevant ID and/or Pairing Information contained in a Primary Device has been erased, lost, become unusable and/or reformatted, the user may use the APP in the said Primary Device to retrieve the relevant ID and/or Pairing Information from the Host to establish and/or maintain connection and/or communication with the existing Secondary Devices.

The invention being thus described, it will be obvious that the same may be varied in many ways. Such variations are not to be regarded as a departure from the principle and scope of the invention, and all such modifications as would obvious to one skilled in the art intended to be included within the scope of following claims.

What is claimed is:

1. A system for pairing one or more devices, the system includes:
   a) at least one smart electronic device with a software application ("APP") to control pairing capabilities;
   b) at least one associated product wired or wirelessly connected with the at least one smart electronic device; and
   c) a server in associating and communicating with the at least one smart electronic device;
   wherein the at least one associated product has a pairing information that is stored into its non-volatile memory, such that the software application ("APP") in the at least one smart electronic device is able to retrieve and receive the pairing information from the at least one associated product so as to establish and to maintain connection and communication with the at least one associated product; said software application ("APP") is in association and communication with the server via a wired or wireless network, cellular network, broadband, the internet, or cloud computing; and
   wherein the system also operates to enable the user to transmit and store the pairing information of the at least one associated product into the server via the at least one smart electronic device, so that to enable such the pairing information to be retrieved and received by a new, substitute or other at least one smart electronic device which will then circumvent the need of reinitiating a pairing process.

2. The system as claimed in claim 1, wherein the at least one associated product and the at least one smart electronic device are a device having pairing capabilities including Bluetooth, WiFi, near field communication (NFC), Zigbee, ANT+, or wireless or Radio Frequency (RF) connection.

3. The system as claimed in claim 1, wherein the at least one smart electronic device is a smartphone, cellular or mobile phone, smart tablet, computer, laptop, personal digital assistants or any smart devices.

4. The system as claimed in claim 1, wherein the pairing information is a MAC address, BT address, Device Serial Number, or other specific data or coding for the purposes of establishing and maintaining connection and communication between the at least one associated product with the at least one smart electronic device.

5. The system as claimed in claim 1, wherein the server is Web Servers, SQL servers, Cloud computing system or any other available servers or database systems.

6. A method for transmitting and storing a pairing information from at least one associated product into a server, the method includes:
   a) pairing or connecting the at least one associated product with at least one smart electronic device either in a wired or wirelessly manner, wherein the at least one smart electronic device has a software application ("APP") to retrieve and receive the pairing information from the at least one associated product that is stored into its non-volatile memory;
   b) associating and establishing communications between the at least one smart electronic device and the server;
   c) transmitting and storing the pairing information that has been retrieved and received from the at least one associated product into the server via the software application ("APP") in the at least one smart electronic device;
   wherein the software application ("APP") in the at least one smart electronic device is in association and communication with the server via a wired or wireless network, cellular network, broadband, the internet, or cloud computing; and
   wherein such transmitted and stored pairing information in the server is retrieved and received by a new, substitute or other at least one smart electronic device so that to circumvent the need of reinitiating pairing process.

7. The method as claimed in claim 6, wherein the at least one associated product and the at least one smart electronic device are a device having pairing capabilities including Bluetooth, WiFi, near field communication (NFC), Zigbee, ANT+, or wireless or Radio Frequency (RF) connection.

8. The method as claimed in claim 6, wherein the at least one smart electronic device is a smartphone, cellular or mobile phone, smart tablet, computer, laptop, personal digital assistants or any smart devices.

9. The method as claimed in claim 6, wherein pairing information of the at least one associated product is a MAC address, BT address, Device Serial Number, or other specific data or coding for the purposes of establishing and maintaining connection and communication between the at least one associated product with the at least one smart electronic device.

10. The method as claimed in claim 6, wherein the server is Web Servers, SQL servers, Cloud computing system or any other available servers or database systems.

11. A method for retrieving and receiving a pairing information from a server into at least one smart electronic device, the method includes:
   a) associating and establishing communications between the at least one smart electronic device with the server;
   b) retrieving and receiving the pairing information of at least one associated product that has previously been transmitted and stored into the server via a software application ("APP") in the at least one smart electronic device;
   c) using such retrieved and received pairing information from the server to establish and maintain connection and communication between the at least one smart electronic device and the at least one associated product;
   wherein the software application ("APP") in the at least one smart electronic device is in association and communication with the server via a wired or wireless network, cellular network, broadband, the internet, or cloud computing; and
   wherein the pairing information of the at least one associated product that has previously been transmitted and stored into the server is retrieved and received by a new, substitute or other at least one smart electronic device so that to circumvent the need of reinitiating pairing process.

12. The method as claimed in claim 11, wherein the at least one associated product and the at least one smart electronic device are a device having pairing capabilities including Bluetooth, WiFi, near field communication (NFC), Zigbee, ANT+, or wireless or Radio Frequency (RF) connection.

13. The method as claimed in claim 11, wherein the at least one smart electronic device is a smartphone, cellular or mobile phone, smart tablet, computer, laptop, personal digital assistants or any smart devices.

14. The method as claimed in claim 11, wherein the pairing information of the at least one associated product is a MAC address, BT address, Device Serial Number, or other specific data or coding for the purposes of establishing and maintaining connection and communication between the at least one associated product with the at least one smart electronic device.

15. The method as claimed in claim 11, wherein the server is Web Servers, SQL servers, Cloud computing system or any other available servers or database systems.

* * * * *